United States Patent [19]

Kukes et al.

[11] Patent Number: 5,494,870
[45] Date of Patent: Feb. 27, 1996

[54] DISTILLATE HYDROGENATION CATALYST

[75] Inventors: Simon G. Kukes, Naperville; Frederick T. Clark, Wheaton; P. Donald Hopkins, St. Charles, all of Ill.

[73] Assignee: Amoco Corporation, Chicago, Ill.

[21] Appl. No.: 232,731

[22] Filed: Apr. 25, 1994

Related U.S. Application Data

[62] Division of Ser. No. 21,530, Feb. 19, 1993, Pat. No. 5,346,612.

[51] Int. Cl.$^6$ .................................................. B01J 29/06
[52] U.S. Cl. ................................................ 502/66; 502/74
[58] Field of Search ............................................. 502/66, 74

[56] References Cited

U.S. PATENT DOCUMENTS

| | | | |
|---|---|---|---|
| 3,308,069 | 3/1967 | Wadlinger et al. | 252/455 |
| 4,683,214 | 7/1987 | Angevine et al. | 502/66 |
| 4,789,656 | 12/1988 | Chen et al. | 502/74 |
| 4,983,274 | 1/1991 | Chen et al. | 208/111 |

*Primary Examiner*—Michael Lewis
*Assistant Examiner*—Thomas G. Dunn, Jr.
*Attorney, Agent, or Firm*—Thomas A. Yassen; Richard A. Kretchmer

[57] ABSTRACT

A process and catalyst are provided for the hydrogenation of a hydrocarbon feedstock consisting essentially of hydrocarbon boiling between about 150° F. and 700° F. at atmospheric pressure. The process comprises reacting the feedstock with hydrogen at hydrogenation conditions in the presence of a catalyst comprising hydrogenation metals and a support comprising beta zeolite. The hydrogenation metals comprise from about 0.1 percent by weight to about 2.0 percent by weight each of palladium and platinum measured as a percentage of the catalyst. The beta zeolite comprises from about 1 ppm by weight to about 3.0 percent by weight sodium calculated as a percentage of said beta zeolite.

6 Claims, No Drawings

DISTILLATE HYDROGENATION CATALYST

This application is a division of U.S. patent application Ser. No. 08/021,530, filed Feb. 19, 1993, for Distillate Hydrogenation, now U.S. Pat. No. 5,346,612.

BACKGROUND OF THE INVENTION

This invention relates to a process and catalyst for reducing the aromatics and olefins content of hydrocarbon distillate products. More particularly, this process relates to an improved catalytic hydrogenation process and catalyst wherein the catalyst comprises platinum and palladium incorporated onto a support comprising beta zeolite and sodium.

For the purpose of the present invention, the term "hydrogenation" is intended to be synonymous with the terms "hydrotreating" and "hydroprocessing," and involves the conversion of hydrocarbons at operating conditions selected to effect a chemical consumption of hydrogen. Included within the processes intended to be encompassed by the term hydrogenation are aromatic hydrogenation, dearomatization, ring-opening, hydrorefining (for nitrogen removal and olefin saturation), and desulfurization (often included in hydrorefining). These processes are all hydrogen-consuming and generally exothermic in nature. For the purpose of the present invention, distillate hydrogenation does not include distillate hydrocracking which is defined as a process wherein at least 15% by weight of the distillate feedstock boiling at a temperature above 430° F. at atmospheric pressure is converted to products boiling below 430° F.

Petroleum refiners are now facing the scenario of providing distillate fuels, boiling in the range of from about 150° F. to about 700° F. at atmospheric pressure, with substantially reduced sulfur and aromatics contents. Sulfur removal is relatively well defined, and at constant pressure and adequate hydrogen supply, is generally a function of catalyst and temperature.

Aromatics removal presents a substantially more difficult challenge. Aromatics removal is generally a function of pressure, temperature, catalyst, and the interaction of these variables on the chemistry and thermodynamic equilibria of the dearomatization reaction. The dearomatization process is further complicated by the wide variances in the aromatics content of the various distillate component streams comprising the hydrogenation process feedstock, the dynamic nature of the flowrates of the various distillate component streams, and the particular mix of mono-aromatics and polycyclic aromatics comprising the distillate component streams.

The criteria for measuring aromatics compliance can pose additional obstacles to aromatics removal processes. The test for measuring aromatics compliance can be, in some regions, the FIA aromatics test (ASTM D1319), which classifies mono-aromatics and polycyclic aromatics equally as "aromatics." Hydrogenation to mono-aromatics is substantially less difficult than saturation of the final ring due to the resonance stabilization of the mono-aromatic ring. Due to these compliance requirements, hydrogenation to mono-aromatics is inadequate. Dearomatization objectives may not be met until a sufficient amount of the polycyclic aromatics and mono-aromatics are fully converted to saturated hydrocarbons.

While dearomatization may require a considerable capital investment on the part of most refiners, dearomatization can provide ancillary benefits. Distillate aromatics content is inextricably related to cetane number, the accepted measure of diesel fuel quality. The cetane number is highly dependent on the paraffinicity of molecular structures, whether they are straight-chain or alkyl attachments to rings. A distillate stream which comprises mostly aromatic rings with few or no alkyl-side chains generally is of lower cetane quality while a highly paraffinic stream is generally of higher cetane quality.

Dearomatization of refinery distillate streams can increase the volume yield of distillate products. Aromatic distillate components are generally lower in gravity than their similarly boiling paraffinic counterparts. Saturation of aromatic rings can convert these lower API gravity aromatic components to higher API gravity saturated components and expand the volume yield of distillate product.

Dearomatization of refinery distillate streams can also provide increased desulfurization and denitrogenation beyond ordinary levels attendant to distillate desulfurization processes. Processes for the dearomatization of refinery distillate streams can comprise the construction of a new dearomatization facility, the addition of a second-stage dearomatization step to an existing distillate hydrogenation facility, or other processing options upstream of distillate hydrogenation or at the hydrogenation facility proper. These dearomatization steps can further reduce the nitrogen and sulfur concentrations of the distillate component and product streams, thus reducing desulfurization and denitrogenation catalyst and temperature requirements in existing distillate hydrogenation facilities designed primarily for hydrorefining. Reduced distillate sulfur and nitrogen concentrations can additionally increase the value of these streams for use as blending stocks to sulfur-constrained liquid fuel systems and as fluid catalytic cracking unit (FCC) feed.

While distillate dearomatization can provide cetane number improvement, volume expansion, and additional desulfurization and denitrogenation, the process has seldom been attractive in view of the large capital costs, the fact that many refiners have not reached distillate cetane limitations, and the relatively low cost of cetane improving additives. Now that legislation exists and further legislation is being considered to mandate substantial reductions in distillate aromatics content, the demand for distillate dearomatization processes is now being largely determined by the incentive to continue marketing distillates.

The use of beta zeolite in catalyst supports for distillate dearomatization has met with limited success and is commercially rare. Beta zeolite is generally paraffin-selective, attacking the paraffinic components of a feedstock in preference to the aromatics so that when a feed containing both aromatic and paraffinic components is processed over zeolite beta, the paraffinic components are converted first with the aromatic components tending to remain until higher conversion is attained. This paraffin-selective behavior is described in U.S. Pat. No. 4,419,220 to Lapierre et al. For this reason, beta zeolite has traditionally been preferred for processes such as catalytic hydrodewaxing.

The use of beta zeolite with noble metals such as palladium and platinum for hydrogenation has been particularly rare since hydrogenation processes have historically emphasized desulfurization and denitrogenation. Transition metals such as cobalt, molybdenum, nickel, and tungsten have generally been preferred alternatives to the noble metals for desulfurization and denitrogenation.

For example, U.S. Pat. No. 5,011,593 to Ware et al. discloses a process for catalytically hydrodesulfurizing catalytically cracked feeds such as light cycle oils over a catalyst containing zeolite beta and transition metals such as cobalt and molybdenum. The hydrodesulfurization process is specifically designed for the desulfurization of feedstocks containing large concentrations of aromatics. Since aromatic saturation is not an objective of the process, Ware et al. notes that the desulfurization process can be effectively operated at low to moderate hydrogen pressures.

U.S. Pat. No. 5,011,593 to Oleck et al. discloses a process for hydrodewaxing heavy petroleum residual feedstocks over a catalyst containing zeolite beta and one or more metals from Group VIA and Group VIII of the Periodic Table such as iron, cobalt, and nickel. The Oleck et al. process utilizes a catalyst comprising 5 to 30 wt % of zeolite beta and having 75% of its pore volume in pores no greater than 100 Angstroms in diameter and 20% of its pore volume in pores greater than about 300 Angstroms in diameter.

Since the above processes are not particularly directed to the dearomatization of distillates, hydrogenation metals such as cobalt, molybdenum, nickel, and tungsten are preferred to noble metals such as palladium and platinum. As noted by Oleck et al., nickel and cobalt hydrogenation metals are generally preferred to the noble metals, and in particular, palladium and platinum, since palladium and platinum can be considerably less effective for desulfurization and denitrogenation.

The use of metal mixtures on a catalyst support has also been the subject of research. (See P. N. Rylander, Catalytic Hydrogenation over Platinum Metals, Academic Press, New York 1967.) Rylander teaches that two platinum metal catalysts, when used together, can give better rates or better yields than either catalyst individually. However, except for certain selected examples, there seems to be no way of predicting when mixtures of catalysts will prove advantageous. A useful guide as to the probable effectiveness of coprecipitated metal catalysts, is the performance of a mechanical mixture of the two metals. (See Rylander, at pages 9–11.)

U.S. Pat. No. 3.943,053 to Kovach et al. discloses a hydrogenation process using a catalyst comprising a particular mixture of platinum and palladium on an inert oxide support such as beta, eta, or gamma alumina. The process provides gasoline and distillate hydrogenation, but with limited hydrogenation activity. The process avoids use of silica-alumina supports since use of silica-alumina in gasoline service can result in the conversion of high octane benzene into substantially lower octane cyclohexane.

More recently, platinum and palladium combinations have been utilized on molecular sieves for distillate hydrogenation.

U.S. Pat. No. 5,1 51,172 to Kukes et al. discloses a process for the hydrogenation of distillate feedstocks over a catalyst comprising a combination of palladium and platinum on a support comprising mordenite.

U.S. Pat. No. 5,147,526 to Kukes et al. discloses a process for the hydrogenation of distillate feedstocks over a catalyst comprising a combination of palladium and platinum on a support comprising zeolite Y with from about 1.5 wt % to about 8.0 wt % of sodium.

The above processes provide a substantial improvement in distillate dearomatization over the prior art desulfurization catalysts described above.

However, it has now been found that processes having a catalyst incorporating metal mixtures of platinum and palladium onto a support comprising beta zeolite, result in a further improvement in overall distillate hydrogenation compared to the prior art hydrogenation processes including processes having a catalyst incorporating platinum and palladium onto inert oxide supports such as alumina and onto molecular sieve-containing supports such as mordenite, zeolite Y, and borosilicate. This particular synergy is more profound (in contradistinction to the teachings of Rylander) since physical mixtures of platinum and palladium on a beta zeolite support have been shown not to provide improved hydrogenation.

It has also been found that processes having a catalyst incorporating metal mixtures of platinum and palladium onto a support comprising beta zeolite combined with a particularly targeted concentration of sodium result in substantially improved hydrogenation compared to prior art hydrogenation processes and to processes having a catalyst incorporating platinum and/or palladium onto a support comprising beta zeolite with lower or higher than the particularly targeted sodium levels.

It is therefore an object of the present invention to provide a process and catalyst that provide improved distillate aromatics saturation.

It is also an object of the present invention to provide a process and catalyst that provide improved distillate desulfurization and denitrogenation.

It is another object of the present invention to provide a process and catalyst that increase distillate cetane number.

It is yet another object of the present invention to provide a process and catalyst that expand the volume of the distillate feedstock.

Other objects appear herein.

SUMMARY OF THE INVENTION

The above objects can be obtained by providing a process for the hydrogenation of a hydrocarbon feedstock consisting essentially of hydrocarbon boiling between about 150° F. and 700° F. at atmospheric pressure. The process comprises reacting the feedstock with hydrogen at hydrogenation conditions in the presence of a catalyst comprising hydrogenation metals and a support comprising beta zeolite. The hydrogenation metals comprise from about 0.1 percent by weight to about 2.0 percent by weight each of palladium and platinum measured as a percentage of the catalyst. The beta zeolite comprises sodium in an amount ranging from about 1 ppm by weight to about 3.0 percent by weight of the beta zeolite.

In another embodiment, the above objects can be obtained by providing a hydrogenation catalyst suitable for hydrogenation of a hydrocarbon feedstock comprising a support comprising beta zeolite and from about 0.1 percent by weight to about 2.0 percent by weight each of palladium and platinum calculated as a percentage of the catalyst. The beta zeolite comprises sodium in an amount ranging from about 1 ppm by weight to about 3.0 percent by weight calculated as a percentage of the beta zeolite.

The process and catalyst of the present invention provide significant advantages over comparative processes such as those described in U.S. Pat. Nos. 3,943,053, 5,151,172, and 5,147,526, which teach naphtha or distillate hydrogenation using platinum and palladium on other supports such as alumina, mordenite, and zeolite Y. The process and catalyst of the present invention provide substantially improved overall dearomatization performance which permits petroleum refiners to meet future distillate product aromatics constraints at minimum cost.

The process and catalyst of the present invention provide increased desulfurization and denitrogenation over prior art processes. This improved desulfurization and denitrogenation can result in a reduction in first-stage hydrorefining catalyst or temperature requirements, increase the attractiveness of using desulfurized distillate to blend down plant fuel sulfur levels for $SO_2$ environmental compliance, and increase the attractiveness of catalytically cracking desulfurized distillates.

The process and catalyst of the present invention provide increased product cetane numbers over prior art processes. Improved distillate product cetane number can reduce costly cetane improver additive requirements and increase premium (high cetane) distillate production capacity.

The process and catalyst of the present invention provide increased distillate volume expansion to meet customer distillate demands at incrementally lower crude run.

BRIEF DESCRIPTION OF THE INVENTION

The hydrocarbon feedstock suitable for use with the present invention generally comprises a substantial portion of a distillate hydrocarbon feedstock, wherein a "substantial portion" is defined as, for purposes of the present invention, at least 50% of the total feedstock by volume. The distillate hydrocarbon feedstock processed in the present invention consists essentially of any one, several, or all refinery streams boiling in a range from about 150° F. to about 700° F., preferably 300° F. to about 700° F., and more preferably between about 350° F. and about 700° F. at atmospheric pressure. For the purpose of the present invention, the term "consisting essentially of" is defined as at least 95% of the feedstock by volume. The lighter hydrocarbon components in the distillate product are generally more profitably recovered to gasoline and the presence of these lower boiling materials in distillate fuels is often constrained by distillate fuel flash point specifications. Heavier hydrocarbon components boiling above 700° F. are generally more profitably processed as FCC feed and convened to gasoline. The presence of heavy hydrocarbon components in distillate fuels is further constrained by distillate fuel end point specifications.

The distillate hydrocarbon feedstock can comprise high and low sulfur virgin distillates derived from high- and low-sulfur crudes, coker distillates, catalytic cracker light and heavy catalytic cycle oils, and distillate boiling range products from hydrocracker and resid hydrotreater facilities. Generally, coker distillate and the light and heavy catalytic cycle oils are the most highly aromatic feedstock components, ranging as high as 80% by weight (FIA). The majority of coker distillate and cycle oil aromatics are present as mono-aromatics and all-aromatics with a smaller portion present as tri-aromatics. Virgin stocks such as high and low sulfur virgin distillates are lower in aromatics content ranging as high as 20% by weight aromatics (FIA). Generally, the aromatics content of a combined hydrogenation facility feedstock will range from about 5% by weight to about 80% by weight, more typically from about 10% by weight to about 70% by weight, and most typically from about 20% by weight to about 60% by weight. In a distillate hydrogenation facility with limited operating capacity, it is generally preferable (most economic) to process feedstocks in order of highest aromaticity, since catalytic processes often proceed to equilibrium product aromatics concentrations. In this manner, maximum distillate pool dearomatization is generally achieved.

The distillate hydrocarbon feedstock sulfur concentration is generally a function of the high and low sulfur crude mix, the hydrogenation capacity of a refinery per barrel of crude capacity, and the alternative dispositions of distillate hydrogenation feedstock components. The higher sulfur distillate feedstock components are generally virgin distillates derived from high sulfur crude, coker distillates, and catalytic cycle oils from fluid catalytic cracking units processing relatively higher sulfur feedstocks. These distillate feedstock components can range as high as 2% by weight elemental sulfur but generally range from about 0.1% by weight to about 0.9% by weight elemental sulfur. Where a hydrogenation facility is a two-stage process having a first-stage denitrogenation and desulfurization zone and a second-stage dearomatization zone, the dearomatization zone feedstock sulfur content can range from about 100 ppm to about 0.9% by weight or as low as from about 10 ppm to about 0.9% by weight elemental sulfur.

The distillate hydrocarbon feedstock nitrogen content is also generally a function of the nitrogen content of the crude oil, the hydrogenation capacity of a refinery per barrel of crude capacity, and the alternative dispositions of distillate hydrogenation feedstock components. The higher nitrogen distillate feedstocks are generally coker distillate and the catalytic cycle oils. These distillate feedstock components typically have total nitrogen concentrations ranging as high as 2,000 ppm, but generally range from about 1 ppm to about 900 ppm.

Where the particular hydrogenation facility in accordance with the present invention is a two-stage process, the first stage is often designed to desulfurize and denitrogenate, and the second stage is designed to dearomatize. In these operations, the feedstocks entering the dearomatization stage are substantially lower in nitrogen and sulfur content and can be lower in aromatics content than the feedstocks entering the hydrogenation facility. It can often be less costly for a refiner to add a second dearomatization stage to an existing hydrogenation facility to save capital costs than to build a new stand-alone facility.

The hydrogenation process of the present invention generally begins with a distillate feedstock preheating step. The feedstock is preheated in feed/effluent heat exchangers prior to entering a furnace for final preheating to a targeted reaction zone inlet temperature. The feedstock can be contacted with a hydrogen stream prior to, during, and/or after preheating. The hydrogen-containing stream can also be added in the hydrogenation reaction zone of a single-stage hydrogenation process or in either the first or second stage of a two-stage hydrogenation process.

The hydrogen stream can be pure hydrogen or can be in admixture with diluents such as low-boiling hydrocarbons, carbon monoxide, carbon dioxide, nitrogen, water, sulfur compounds, and the like. The hydrogen stream purity should be at least about 50% by volume hydrogen, preferably at least about 65% by volume hydrogen, and more preferably at least about 75% by volume hydrogen for best results. Hydrogen can be supplied from a hydrogen plant, a catalytic reforming facility, or other hydrogen-producing or hydrogen-recovery processes known in the art.

The reaction zone can consist of one or more fixed bed reactors containing the same or different catalysts. Two-stage processes can be designed with at least one fixed bed reactor for desulfurization and denitrogenation, and at least one fixed bed reactor for dearomatization. A fixed bed reactor can also comprise a plurality of catalyst beds. The plurality of catalyst beds in a single fixed bed reactor can also comprise the same or different catalysts. Where the catalysts are different in a multi-bed fixed bed reactor, the initial bed or beds are generally for desulfurization and denitrogenation, and subsequent beds are for dearomatization.

Since the hydrogenation reaction is generally exothermic, interstage cooling, consisting of heat transfer devices between fixed bed reactors or between catalyst beds in the same reactor shell, can be employed. At least a portion of the heat generated from the hydrogenation process can often be profitably recovered for use in the hydrogenation process. A suitable heat sink for absorbing such heat provided by the hydrogenation reaction exotherm can and generally includes the feedstock preheat section of the hydrogenation process upstream of the reactor preheat furnace described hereabove. Where this heat recovery option is not available, cooling of the reaction zone effluent may be performed through cooling utilities such as cooling water or air, or through use of a hydrogen quench stream injected directly into the reactors. Two-stage processes can often provide reduced temperature exotherm per reactor shell and provide better hydrogenation reactor temperature control.

The reaction zone effluent is generally cooled and the effluent stream is directed to a separator device to remove the hydrogen. Some of the recovered hydrogen can be recycled back to the process while some of the hydrogen can be purged to external systems such as plant or refinery fuel. The hydrogen purge rate is often controlled to maintain a minimum hydrogen purity and to remove hydrogen sulfide. Recycled hydrogen is generally compressed, supplemented with "make-up" hydrogen, and reinjected into the process for further hydrogenation.

The separator device liquid effluent can then be processed in a stripper device where light hydrocarbons can be removed and directed to more appropriate hydrocarbon pools. The stripper liquid effluent product is then generally conveyed to blending facilities for production of finished distillate products.

Operating conditions to be used in the hydrogenation process of the present invention include an average reaction zone temperature of from about 400° F. to about 750° F., preferably from about 500° F. to about 700° F., and more preferably from about 525° F. to about 625° F. for best results. Reaction temperatures below these ranges can result in less effective hydrogenation. Excessively high temperatures can cause the process to reach a thermodynamic aromatic reduction limit, thereby causing hydrocracking, catalyst deactivation, and increased energy costs. Desulfurization aspects of the process of the present invention are generally less affected by reaction zone temperature than prior art processes, especially at feed sulfur levels below 500 ppm, such as in the second-stage dearomatization zone of a two-stage process.

The process of the present invention generally operates at reaction zone pressures ranging from about 300 psig to about 2,000 psig, preferably from about 500 psig to about 1,500 psig, and more preferably from about 600 psig to about 1,200 psig for best results. Hydrogen circulation rates generally range from about 500 SCF/Bbl to about 20,000 SCF/Bbl, preferably from about 1,000 SCF/Bbl to about 15,000 SCF/Bbl, and more preferably from about 3,000 to about 13,000 SCF/Bbl for best results. Reaction pressures and hydrogen circulation rates below these ranges can result in higher catalyst deactivation rates resulting in less effective desulfurization, denitrogenation, and dearomatization. Excessively high reaction pressures increase energy and equipment costs and provide diminishing marginal benefits.

The process of the present invention generally operates at a liquid hourly space velocity (LHSV) of from about 0.2 hr$^{-1}$ to about 10.0 hr$^{-1}$, preferably from about 0.5 hr$^{-1}$ to about 4.0 hr$^{-1}$, and more preferably from about 1.0 hr$^{-1}$ to about 2.0 hr$^{-1}$ for best results. Excessively high space velocities will result in reduced overall hydrogenation.

The process and catalyst of the present invention comprise a catalyst having a crystalline beta zeolite molecular sieve and a hydrogenation metals component comprising palladium and platinum.

The catalyst support component of the present invention comprises beta zeolite and a [refactory inorganic oxide] such as silica, alumina, or silica-alumina. The beta zeolite component is present in the support in an amount ranging from about 10 percent by weight to about 90 percent by weight, preferably from about 40 percent by weight to about 85 percent by weight, and more preferably from about 50 percent by weight to about 80 percent by weight for best results. The refractory inorganic oxide, suitable for use in the present invention, has a pore diameter ranging from about 50 Angstroms to about 200 Angstroms and more preferably from about 80 Angstroms to about 150 Angstroms for best results.

Beta zeolite crystalline molecular sieves are generally known in the art of catalysis and can be characterized by their X-ray diffraction data which are set out in U.S. Pat. Nos. 3,308,069 and Re. 28,341. The significant d values (Angstroms, radiation: K alpha doublet of copper, Geiger counter spectrometer) are described below:

| d Values of Reflections in Beta Zeolite |
|---|
| 11.40 + 0.2 |
| 7.40 + 0.2 |
| 6.70 + 0.2 |
| 4.25 + 0.1 |
| 3.97 + 0.1 |
| 3.00 + 0.1 |
| 2.20 + 0.1 |

The composition of beta zeolite in its as-synthesized form (anhydrous basis) is as follows:

$$[XNa(1.0\pm 0.1-X)TEA]AlO_2.YSiO_2$$

wherein X is less than 1 and preferably less than 0.75; TEA represents the tetraethylammonium ion; and Y ranges from about 5 to about 100. In the as-synthesized form, water of hydration may also be present.

The sodium is generally derived from the synthesis mixture used to prepare the zeolite. The synthesis mixture generally contains a mixture of the oxides (or the materials whose chemical compositions can be formally represented as mixtures of the oxides) $Na_2O$, $Al_2O_3$, $[(C_2H_5)_4N]_2O$, $SiO_2$, and $H_2O$. The mixture is generally held at a temperature ranging from about 167° F. to about 392° F. until crystallization occurs.

Since tetraethylammonium hydroxide is also commonly used in its preparation, zeolite beta may contain occluded tetraethylammonium ions (e.g., as the hydroxide or silicate) within its pores in addition to that required by electroneutrality and indicated in the calculated parameters to be provided in this specification. The parameters are calculated using one equivalent of cation per Al atom in tetrahedral coordination in the crystal lattice.

The composition of the reaction mixture, expressed in terms of mole ratios, preferably falls within the following ranges:

| Reaction Mixture Mole Ratios | |
|---|---|
| $SiO_2/Al_2O_3$ | 1:10 to 100:1 |
| $Na_2O/TEAOH$ | 0.0 to 1.0 |
| $TEAOH/SiO_2$ | 0.1 to 1.0 |
| $H_2O/TEAOH$ | 20 to 75 |

The product which crystallizes from the hot reaction mixture is separated by centrifuging or filtration, washed with water, and dried. The dried material can be calcined by heating in air or an inert atmosphere at a temperature generally ranging from about 392° F. to about 1652° F. Calcination generally degrades the tetraethylammonium ions to hydrogen ions and removes the water so that N in the formula above becomes or approximates zero. The formula of the zeolite is then:

[XNa(1.0±0.1−X)H]AlO₂.YSiO₂ where X and Y have the values described above. The degree of hydration is assumed to be zero following the calcination.

Beta zeolite in the hydrogen form can also be subjected to base or ion-exchange, wherein the sodium may be replaced by another cation to provide a beta zeolite having the formula (anhydrous basis):

[x M/n(1±0.1−X)H]AlO₂.YSiO₂ where X and Y have the values described above and n is the valence of the metal M which can be any metal but is preferably a metal of Groups IA, IIA, or IIIA of the Periodic Table or a transition metal (the Periodic Table referred to in this specification is the table approved by IUPAC, and the National Bureau of Standards and Technology).

The as-synthesized sodium form of the zeolite can also be subjected to base or ion-exchange directly without intermediate calcination to give a material of the formula (anhydrous basis):

[x M/n(1±0.1−X)TEA]AlO₂.YSiO₂ where X, Y, n, and m are described above. This form of the zeolite may then be converted partly to the hydrogen form by calcination e.g. at 392° F. to about 1652° F. The completely hydrogen form may be made by ammonium exchange followed by calcination in air or an inert atmosphere such as nitrogen.

The preferred hydrogenation catalyst comprises a beta zeolite component with a particularly targeted sodium concentration ranging from about 1 ppm by weight to about 3.0 percent by weight, preferably from about 1 ppm by weight to about 2.0 percent by weight, and more preferably from about 1 ppm by weight to about 1.5 percent by weight for best results.

Where the sodium concentration of the source beta zeolite molecular sieve is above the particularly targeted sodium level, the sodium is generally removed by replacement of sodium ions with ammonium ions followed by decomposition of the ammonium form by calcination as described above. Chemical analysis of the calcined product of the ammonium form of beta zeolite generally shows that complete decomposition of the ammonium ion has occurred, yet the X-ray pattern of the product is generally the same as that of the original ammonium form. Thus, little if any destruction of the crystalline alumino-silicate lattice is detected.

Where the sodium concentration of the source beta zeolite molecular sieve is below the particularly targeted sodium level, sodium can be back-added to the beta zeolite by impregnation employing the heat-decomposable salts of sodium or other methods known to those skilled in the art such as ion-exchange, with impregnation being preferred. Other suitable exchangeable cations, in addition to sodium, can be added to the catalyst of the present invention. Suitable exchangeable cations can include the alkali metals and alkali earth metals and preferably lithium, potassium, barium, calcium, and magnesium. Suitable aqueous impregnation solutions can include, but are not limited to sodium nitrate and sodium acetate.

Impregnation using sodium nitrate or sodium acetate can begin by precalcining the beta zeolite in preparation for using incipient wetness techniques. Under common incipient wetness techniques, a determination is generally made as to the amount of water required to saturate and fill the pores of the beta zeolite. A solution is then prepared utilizing the predetermined amount of water and a sufficient amount of the sodium salt to provide a beta zeolite component having the desired concentration of sodium. The impregnated beta zeolite is then separated, drained, and dried in preparation for calcining. Calcination is generally performed at a temperature ranging from about 932° F. to about 1,202° F., and preferably from about 977° F. to about 1067° F.

The beta zeolite utilized in the catalyst of the present invention can be dealuminized to a silicon to aluminum atomic ratio ranging from about 8 to about 50, preferably from about 10 to about 40, and more preferably from about 10 to about 30 for best results. For purpose of the present invention, a silicon to aluminum atomic ratio of 10 is equivalent to a silica to alumina molar ratio of 20. Silicon to aluminum atomic ratio ranges above 30 can provide less effective dearomatization. Suitable beta zeolite compositions for use as starting materials in producing the catalyst of the present invention are Valfor CP811-25 and Valfor C-81 5 Beta, manufactured by the PQ Corporation.

Processes for the dealumination of zeolites such as beta zeolite are well known. Generally, zeolite dealumination is accomplished by chemical methods such as treatments with acids, e.g., HCl, with volatile halides, e.g., SiCl₄, or with chelating agents such as ethylenediaminetetraacetic acid (EDTA). Another common technique is the hydrothermal treatment of the beta zeolite in either pure steam or in air/steam mixtures.

The final calcined catalyst used in the present invention includes a hydrogenation component comprising palladium and platinum. These metals can be present in the catalyst in their elemental form or as their oxides, sulfides, or mixtures thereof. The palladium and platinum are each generally present in an amount ranging from about 0.1 percent by weight to about 2.0 percent by weight, preferably from about 0.2 percent by weight to about 1.5 percent by weight, and more preferably from about 0.3 percent by weight to about 1.2 percent by weight based on the total weight of the catalyst and calculated as oxide, for best results. Catalyst metals concentrations outside of these total metals content ranges can be less economic, Higher metals concentrations can require more total hydrogenation component due to reduced dispersion and feed/catalyst contact. Lower metals concentrations can result in increased support material, catalyst handling, transportation, and capital costs.

The weight ratio of elemental palladium to elemental platinum generally ranges from about 10:1 to 1:10, preferably from about 8:1 to 1:2, and more preferably from about 5:1 to 1:1 for best results. Foregoing one of the hydrogenation metals or exceeding the weight ratio ranges can result in less effective hydrogenation.

The hydrogenation component can be deposed or incorporated upon the support by impregnation employing heat-decomposable salts of platinum and palladium or other methods known to those skilled in the art such as ion-exchange, with impregnation methods being preferred. The platinum and palladium can be impregnated onto the support separately, or can be co-impregnated onto the support. Suitable aqueous impregnation solutions include, but are not limited to, chloroplatinic acid, palladium chloride, tetrammine palladium chloride, and tetrammine platinum chloride.

Impregnation using tetrammine palladium chloride and tetrammine platinum chloride can be performed by precalcining the catalyst support, in the form of a powder, pellets, extrudates, or spheres and determining the amount of water that must be added to wet all of the material. The tetrammine palladium chloride and tetrammine platinum chloride are then dissolved in the calculated amount of water, and the solution added to the support in a manner such that the solution completely saturates the support. The tetrammine palladium chloride and tetrammine platinum chloride are added in a manner such that the aqueous solution contains the total amount of elemental palladium and platinum to be deposited on the given mass of support. Impregnation can be performed for each metal separately, including an intervening drying step between impregnations, or as a single co-impregnation step. The saturated support can then be separated, drained, and dried in preparation for calcining. Commercially, draining volumes can be reduced in order to reduce palladium and platinum losses and waste water handling costs, by providing less than the full amount of aqueous solution (such as from 90% to 100% by volume of aqueous solution) necessary to saturate all of the support. Calcination generally is performed at a temperature of from about 932° F. to about 1202° F., and preferably from about 977° F. to about 1067° F. for best results.

It has been found that catalysts and processes having a catalyst incorporating metal mixtures of platinum and palladium onto a support comprising beta zeolite combined with the particularly targeted concentration ranges of sodium described herein, result in substantially improved hydrogenation compared to processes having a catalyst incorporating platinum and/or palladium on a support comprising beta zeolite with lower or higher sodium levels. While not wishing to be bound to any theory, the present invention with its particularly targeted sodium concentration, may achieve these superior results in part due to catalyst acidity control. Calcination of ammonium-containing zeolites drives off ammonia and leaves behind protons (Bronsted acids). A proper and critical balance between hydrogenation activity, provided by the palladium and platinum, and cracking-isomerization activity, provided by the protons, may be a key to the superior catalyst and process performance. Hydrogen that is activated or dissociated on the palladium and platinum sites may be transferred to the aromatics through the proton sites. In this manner and under this mechanism, insufficient proton sites would reduce saturation activity and too many proton sites would lead to undesirable side reactions. This phenomena may be partly responsible for the surprising and unexpected results.

The process and catalyst of the present invention comprising hydrogenation of a distillate boiling range feedstock utilizing a catalyst comprising palladium and platinum and a support comprising beta zeolite with a particularly targeted concentration of sodium, provides superior dearomatization performance. Dearomatization performance is generally measured by the percentage of aromatics saturated, calculated as the weight percentage of aromatics in the hydrogenation process product subtracted from the weight percentage of aromatics in the feedstock divided by the weight percentage of aromatics in the feedstock. The hydrogenation process in accordance with the principles of the present invention can generally attain and sustain aromatics saturation levels of greater than 45 percent, greater than 65 percent, and as high as or higher than 75 percent. This high level of aromatics saturation provides for a hydrogenation process that can operate at less severe and costly operating conditions, prolonging catalyst life.

The hydrogenation process and catalyst of the present invention provide outstanding desulfurization and denitrogenation performance. The hydrogenation process in accordance with the principles of the present invention can generally attain product sulfur levels below 50 ppm, below 20 ppm, and below 5 ppm. The hydrogenation process in accordance with the principles of the present invention can generally attain product nitrogen levels below 10 ppm, below 3 ppm, and as low as 1 ppm. This level of desulfurization and denitrogenation can result in a reduction in first-stage hydrorefining catalyst requirements, increase the attractiveness of using desulfurized distillate to blend down plant fuel sulfur levels for SO2 environmental compliance, and increase the attractiveness of catalytically cracking desulfurized distillates.

The hydrogenation process and catalyst of the present invention provide a substantial increase in distillate product cetane number. Higher fluid catalytic cracking severity has resulted in FCC distillate products having lower cetane numbers, adding cetane limitations in refinery distillate pools that previously may not have existed. The hydrogenation process in accordance with the principles of the present invention can generally achieve product cetane number improvements of over 8 numbers, over 11 numbers, and as high as 13 numbers. Improved cetane production can reduce costly cetane improver additive requirements and increase premium (high cetane) distillate production capacity.

The hydrogenation process and catalyst of the present invention provide substantial distillate volume expansion. Distillate volume expansion is generally measured by the reduction in specific gravity across the hydrogenation process and is calculated as the specific gravity of the hydrogenation process product subtracted from the specific gravity of the feedstock divided by the specific gravity of the feedstock. The hydrogenation process in accordance with the principles of the present invention can expand the volume of the distillate feedstock by more than 3.5 percent, more than 5 percent, and more than 6 percent. Volume expansion across a distillate hydrogenation process can permit petroleum refiners to meet customer distillate demands at incrementally lower crude run.

The present invention is described in further detail in connection with the following examples, it being understood that the same are for purposes of illustration and not limitation.

EXAMPLE 1

A beta zeolite with low sodium hydrogenation catalyst was prepared from a highly crystalline low sodium beta zeolite molecular sieve, brand number Valfor CP811-25, purchased from the PQ Corporation. The beta zeolite contained 3.08 percent by weight aluminum and 89 ppm by weight sodium. The silicon to aluminum atomic ratio was about 14:1.

The beta zeolite component was impregnated with palladium using incipient wetness techniques. The amount of water required to saturate and fill the pores of the beta zeolite was determined and an aqueous solution was prepared with this amount of water and a sufficient amount of tetrammine palladium chloride to provide a finished catalyst having 0.50 wt % elemental palladium. The hydrogenation catalyst was dried for 12 hours at 250° F.

The impregnated beta zeolite catalyst was mixed with a sufficient amount of gamma alumina sol to provide a catalyst containing 60 wt % beta zeolite and 40 wt % alumina on an anhydrous basis, homogenized, and dried for 12 hours at 250° F. The beta zeolite with low sodium hydrogenation catalyst was extruded into 1/16 inch extrudates, dried for 12 hours at 250° F., and calcined at 1000° F. for 3 hours. The catalyst was designated as Catalyst 1 and the composition and properties of the catalyst are specified in Table 1.

EXAMPLE 2

A beta zeolite with low sodium hydrogenation catalyst was prepared in a manner similar to that described in Example 1. The hydrogenation catalyst was impregnated with an aqueous solution of a sufficient amount of tetrammine platinum chloride in water to provide a hydrogenation catalyst having 0.5 wt % elemental platinum. The hydrogenation catalyst was dried for 12 hours at 250° F.

The impregnated beta zeolite catalyst was mixed with a sufficient amount of gamma alumina sol to provide a catalyst containing 60 wt % beta zeolite and 40 wt % alumina on an anhydrous basis, homogenized, and dried for 12 hours at 250° F. The beta zeolite with low sodium hydrogenation catalyst was extruded into 1/16 inch extrudates, dried for 12 hours at 250° F., and calcined at 1000° F. for 3 hours. The catalyst was designated as Catalyst 2 and the composition and properties of the catalyst are specified in Table 1.

EXAMPLE 3

A beta zeolite with low sodium hydrogenation catalyst was prepared as a 50%/50% physical mixture by weight of the beta zeolite with low sodium hydrogenation Catalysts 1 and 2 of Examples 1 and 2. The composite catalyst was designated as Catalyst 3 and the composition and properties of the catalyst are specified in Table 1.

EXAMPLE 4

A beta zeolite with low sodium hydrogenation catalyst was prepared in a manner similar to that described in Example 1. The hydrogenation catalyst was co-impregnated with palladium and platinum in a manner so as to provide a finished catalyst having 0.25 wt % elemental palladium and 0.25 wt % elemental platinum as described in Example 1. The hydrogenation Catalyst was dried for 12 hours at 250° F.

The impregnated beta zeolite catalyst was mixed with a sufficient amount of gamma alumina sol to provide a catalyst containing 60 wt % beta zeolite and 40 wt % alumina on an anhydrous basis, homogenized, and dried for 12 hours at 250° F. The beta zeolite with low sodium hydrogenation catalyst was extruded into 1/16 inch extrudates, dried for 12 hours at 250° F., and calcined at 1000° F. for 3 hours. The catalyst was designated as Catalyst 4 and the composition and properties of the catalyst are specified in Table 1.

EXAMPLE 5

A beta zeolite with moderate sodium hydrogenation catalyst was prepared from a highly crystalline beta zeolite, brand number Valfor C-815 Beta, purchased from the PQ Corporation. The beta zeolite contained 2.93 percent by weight aluminum and 0.233 percent by weight sodium. The silicon to aluminum atomic ratio was about 14:1.

The hydrogenation catalyst was co-impregnated with palladium and platinum in a manner so as to provide a finished catalyst having 0.25 wt % elemental palladium and 0.25 wt % elemental platinum as described in Example 1. The hydrogenation catalyst was tided for 12 hours at 250° F.

The impregnated beta zeolite catalyst was mixed with a sufficient amount of gamma alumina sol to provide a catalyst containing 60 wt % beta zeolite and 40 wt % alumina on an anhydrous basis, homogenized, and dried for 12 hours at 250° F. The beta zeolite with moderate sodium hydrogenation catalyst was extruded into 1/16 inch extrudates, dried for 12 hours at 250° F., and calcined at 1000° F. for 3 hours. The catalyst was designated as Catalyst 5 and the composition and properties of the catalyst are specified in Table 1.

EXAMPLE 6

Comparative hydrogenation catalysts utilizing alumina and other molecular sieve-containing supports were prepared for comparison with the hydrogenation catalysts of the present invention (Examples 6–9).

Gamma alumina was extruded into 1/16-inch extrudates, dried at 250° F. for 12 hours, and calcined at 1000° F. for 10 hours. The hydrogenation catalyst was co-impregnated with palladium and platinum in a manner so as to provide a hydrogenation catalyst having 0.25 wt % elemental palladium and 0.25 wt % elemental platinum as described in Example 1. The catalyst was designated as Catalyst 6 and the composition and properties of the catalyst are specified in Table 1.

EXAMPLE 7

A zeolite Y with sodium hydrogenation catalyst was prepared from an as-synthesized form of zeolite Y, brand number LZ-Y52, purchased from the Linde Division of Union Carbide (now UOP). The as-synthesized zeolite Y contained 11.4 wt % aluminum and 9.6 wt % sodium. The unit cell parameter was 24.68 ,A, and the silicon to aluminum atomic ratio was about 2.6:1.

The as-synthesized zeolite Y was ammonium exchanged with a solution of 500 g of as-synthesized zeolite Y, 500 g of ammonium nitrate, and 5000 cc of water in order to remove sodium. The mixture was mixed for 4 hours, filtered, washed, and dried for 12 hours at 250° F. The ammonium exchanged zeolite Y had a sodium content of 3.1 wt %.

The ammonium exchanged zeolite Y was co-impregnated with palladium and platinum in a manner so as to provide a finished catalyst having 0.25 wt % elemental palladium and 0.25 wt % elemental platinum as described in Example 1. The hydrogenation catalyst was dried for 12 hours at 250° F.

The impregnated ammonium exchanged zeolite Y catalyst was mixed with a sufficient amount of gamma alumina sol to provide a catalyst containing 60 wt % zeolite Y and 40 wt % alumina on an anhydrous basis, homogenized, and dried for 12 hours at 250° F. The zeolite Y hydrogenation catalyst was extruded into 1/16 inch extrudates, dried for 12 hours at 250° F., and calcined at 1000° F. for 3 hours. The catalyst was designated as Catalyst 7 and the composition and properties of the catalyst are specified in Table 1.

EXAMPLE 8

A borosilicate hydrogenation catalyst was prepared using AMSAC-3400 1/16 inch extrudate borosilicate-containing molecular sieve support material (manufactured by American Cyanamid Company). The AMSAC-3400 extrudate comprised about 40 wt % HAMS 1B-3 borosilicate sieve (manufactured by ARCHEM Chemical Company, Houston, Tex.) and about 60 wt % of a commercially available alumina sol (PHF alumina manufactured by American Cyanamid Company) and was prepared in a manner similar to that described in European Patent No. 0 184 461 to Haddad et al. and U.S. Pat. No. 4,725,570 to Haddad et al., the disclosures of which are hereby incorporated by reference.

The AMSAC-3400 borosilicate-containing molecular sieve support material was co-impregnated with palladium and platinum in a manner so as to provide a finished catalyst having 0.25 wt % elemental palladium and, 0.25 wt % elemental platinum as described in Example 1. The catalyst was designated as Catalyst 8 and the composition and properties of the catalyst are specified in Table 1.

EXAMPLE 9

A mordenite hydrogenation catalyst was prepared by mixing mordenite having a silicon to aluminum atomic ratio of about 11.5:1 (CBV-20A, manufactured by Conteka B,V.) with gamma alumina sol to provide a support mixture containing 60 wt % mordenite and 40 wt % dry alumina. The mixture was dried for 12 hours at 248° F. The mordenite hydrogenation catalyst support was extruded into 1/16 inch extrudates, dried for 12 hours at 248° F., and calcined at 1000° F. for 3 hours.

The mordenite-containing hydrogenation catalyst was co-impregnated with palladium and platinum in a manner so as to provide a mordenite component having 0.25 wt % elemental palladium and 0.25 wt % elemental platinum as described in Example 1. The catalyst was designated as Catalyst 9 and the composition and properties of the catalyst are specified in Table 1.

TABLE 1

DISTILLATE DEAROMATIZATION

| | Catalyst | | | | | | | | | | |
|---|---|---|---|---|---|---|---|---|---|---|---|
| | 1 | 2 | 3 | 4 | 4 | 5 | 5 | 6 | 7 | 8 | 9 |
| Catalyst Composition | | | | | | | | | | | |
| Support Material | BETA | BETA | BETA | BETA | BETA | BETA | BETA | ALUM | Y | BORO | MORD |
| Molecular Sieve Si:Al or B Atomic Ratio | 14:1 | 14:1 | 14:1 | 14:1 | 14:1 | 14:1 | 14:1 | NA | 2.5:1 | 24:1 | 11.5:1 |
| Sodium, wt. % (ppm) | (89) | (89) | (89) | (89) | (89) | 0.233 | 0.233 | (4) | 3.1 | (50) | (253) |
| Palladium, wt. % | 0.5 | 0.0 | 0.25[1] | 0.25 | 0.25 | 0.25 | 0.25 | 0.25 | 0.25 | 0.25 | 0.25 |
| Platinum, wt. % | 0.0 | 0.5 | 0.25[1] | 0.25 | 0.25 | 0.25 | 0.25 | 0.25 | 0.25 | 0.25 | 0.25 |
| Sieve Conc. In Support, wt. % | 60 | 60 | 60 | 60 | 60 | 60 | 60 | 60 | 60 | 40 | 60 |
| Process Conditions | | | | | | | | | | | |
| Temperature, °F. | 600 | 600 | 600 | 600 | 600 | 600 | 600 | 600 | 600 | 600 | 600 |
| Pressure, psig | 1200 | 1200 | 1200 | 1200 | 1200 | 1200 | 1200 | 1200 | 1200 | 1200 | 1200 |
| Hydrogen Rate, SCF/Bbl | 4000 | 4000 | 4000 | 4000 | 4000 | 4000 | 4000 | 4000 | 4000 | 4000 | 4000 |
| WHSV$^{-1}$ | 1.0 | 1.0 | 1.0 | 1.0 | 1.0 | 1.0 | 1.0 | 1.0 | 1.0 | 1.0 | 1.0 |
| Feedstock | B | A | A | B | A | B | A | A | B | A | B |
| Product Properties and Process Calculations | | | | | | | | | | | |
| API Gravity | 30.3 | 28.6 | 27.8 | 33.4 | 38.3 | 33.8 | 35.3 | 27.5 | 32.3 | 32.9 | 29.2 |
| Sulfur, ppm | 74 | 46 | 181 | 7 | 2 | 14 | 1 | 97 | 18 | 7 | 37 |
| Nitrogen, ppm | 1 | <1 | <1 | <1 | <1 | <1 | <1 | 27 | <1 | <1 | 5 |
| Aromatics, wt. % | 38.4 | 57.0 | 55.0 | 20.4 | 5.9 | 13.2 | 15.0 | 54.6 | 14.7 | 9.6 | 39.1 |
| % Aromatic Saturation | 43 | 17 | 19 | 70 | 91 | 80 | 78 | 20 | 78 | 86 | 41 |
| H/C Ratio, mole | 1.71 | 1.64 | 1.63 | 1.78 | 1.89 | 1.84 | 1.82 | 1.63 | 1.84 | 1.85 | 1.72 |
| Volume Expansion, % | 4.1 | 3.0 | 2.4 | 6.0 | 9.1 | 6.3 | 7.2 | 2.2 | 5.3 | 5.7 | 3.3 |
| Cetane Number, calc. | 41.9 | 38.1 | 36.9 | 46.6 | 53.5 | 47.3 | 48.4 | 36.5 | 44.9 | 44.6 | 40.2 |
| Cetane Number, Inc. | 8.8 | 6.2 | 5.0 | 13.5 | 21.6 | 14.2 | 16.5 | 4.6 | 11.8 | 12.7 | 7.1 |

[1]Physical Mixture of Pd/Pt

EXAMPLE 10

A beta zeolite with moderate sodium hydrogenation catalyst was prepared from a highly crystalline beta zeolite, brand number Valfor C-815 Beta, purchased from the PQ Corporation. The beta zeolite contained 2.93 percent by weight aluminum and 0.233 percent by weight sodium. The silicon to aluminum atomic ratio was about 14:1.

The hydrogenation catalyst was impregnated with an aqueous solution of a sufficient amount of tetrammine palladium chloride in water to provide a hydrogenation catalyst having 0.5 wt % elemental palladium. The hydrogenation catalyst was dried for 12 hours at 250° F.

The impregnated beta zeolite was mixed with a sufficient amount of gamma alumina sol to provide a catalyst containing 60 wt % beta zeolite and 40 wt % alumina on an anhydrous basis, homogenized, and dried for 12 hours at 250° F. The beta zeolite with moderate sodium hydrogenation catalyst was extruded into 1/16 inch extrudates, dried for 12 hours at 250° F., and calcined at 1000° F. for 3 hours. The catalyst was designated as Catalyst 10 and the composition and properties of the Catalyst are specified in Table 2.

EXAMPLE 11

A beta zeolite with back-added sodium hydrogenation catalyst was prepared from a highly crystalline beta zeolite, brand number Valfor C-815 Beta, purchased from the PQ Corporation. The beta zeolite contained 2.93 percent by weight aluminum and 0.233 percent by weight sodium. The silicon to aluminum atomic ratio was about 14:1.

The beta zeolite component was impregnated with a sufficient amount of sodium nitrate in water to form a beta zeolite component having 0.27 wt % sodium and based on the total weight of the beta zeolite. The mixture was mixed periodically at room temperature for a period of 24 hours and dried for 12 hours at 250° F.

The hydrogenation catalyst with back-added sodium was co-impregnated with palladium and platinum in a manner so as to provide a finished catalyst having 0.25 wt % elemental palladium and 0.25 wt % elemental platinum as described in Example 1. The hydrogenation catalyst was dried for 12 hours at 250° F.

The impregnated beta zeolite with back-added sodium was mixed with a sufficient amount of gamma alumina sol to provide a catalyst containing 60 wt % beta zeolite and 40 wt % alumina on an anhydrous basis, homogenized, and dried for 12 hours at 250° F. The beta zeolite with back-added sodium hydrogenation catalyst was extruded into 1/16 inch extrudates, dried for 12 hours at 250° F., and calcined at 1000° F. for 3 hours. The catalyst was designated as Catalyst 11 and the composition and properties of the catalyst are specified in Table 2.

EXAMPLE 12

A beta zeolite with back-added sodium hydrogenation catalyst was prepared in a manner similar to that described in Example 11 except that the beta zeolite of Example 12 was impregnated with a sufficient amount of sodium nitrate in water to form a beta zeolite component having 0.77 wt % sodium based on the total weight of the beta zeolite. The catalyst was designated as Catalyst 12 and the composition and properties of the catalyst are specified in Table 2.

EXAMPLE 13

A beta zeolite with back-added sodium hydrogenation catalyst was prepared in a manner similar to that described in Example 11 except that the beta zeolite of Example 13 was impregnated with a sufficient amount of sodium nitrate in water to form a beta zeolite component having 1.27 wt % sodium based on the total weight of the beta zeolite. The catalyst was designated as Catalyst 13 and the composition and properties of the catalyst are specified in Table 2.

EXAMPLE 14

A beta zeolite with back-added sodium hydrogenation catalyst was prepared in a manner similar to that described in Example 11 except that the beta zeolite of Example 14 was impregnated with a sufficient amount of sodium nitrate in water to form a beta zeolite component having 1.77 wt % sodium based on the total weight of the beta zeolite. The catalyst was designated as Catalyst 14 and the composition and properties of the catalyst are specified in Table 2.

EXAMPLE 15

A beta zeolite with back-added sodium hydrogenation catalyst was prepared in a manner similar to that described in Example 11 except that the beta zeolite of Example 15 was impregnated with a sufficient amount of sodium nitrate in water to form a beta zeolite component having 2.77 wt % sodium based on the total weight of the beta zeolite. The catalyst was designated as Catalyst 15 and the composition and properties of the catalyst are specified in Table 2.

TABLE 2

| | \multicolumn{6}{c}{DISTILLATE DEAROMATIZATION} |
|---|---|---|---|---|---|---|
| | \multicolumn{6}{c}{Catalyst} |
| | 10 | 11 | 12 | 13 | 14 | 15 |
| Catalyst Composition | | | | | | |
| Support Material | BETA | BETA | BETA | BETA | BETA | BETA |
| Molecular Sieve Si:Al Atomic Ratio | 14:1 | 14:1 | 14:1 | 14:1 | 14:1 | 14:1 |
| Sodium, wt. % | 0.233 | 0.27 | 0.77 | 1.27 | 1.77 | 2.77 |
| Palladium, wt. % | 0.50 | 0.25 | 0.25 | 0.25 | 0.25 | 0.25 |
| Platinum, wt. % | 0.00 | 0.25 | 0.25 | 0.25 | 0.25 | 0.25 |
| Sieve Conc. In Support, wt. % | 60 | 60 | 60 | 60 | 60 | 60 |
| Process Conditions | | | | | | |
| Temperature, °F. | 600 | 600 | 600 | 600 | 600 | 600 |
| Pressure, psig | 1200 | 1200 | 1200 | 1200 | 1200 | 1200 |
| Hydrogen Rate, SCF/Bbl | 4000 | 4000 | 4000 | 4000 | 4000 | 4000 |
| WHSV$^{-1}$ | 1.0 | 1.0 | 1.0 | 1.0 | 1.0 | 1.0 |
| Feedstock | B | A | A | A | A | A |
| Product Properties and Process Calculations | | | | | | |
| API Gravity | 29.6 | 33.9 | 32.9 | 32.2 | 29.9 | 30.2 |
| Sulfur, ppm | 107 | 1 | 5 | 14 | 18 | 48 |
| Nitrogen, ppm | 2 | <1 | <1 | 1 | 1 | 2 |
| Aromatics, wt. % | <1.8 | 15.3 | 19.6 | 22.5 | 36.6 | 33.9 |
| % Aromatic Saturation | 38 | 78 | 71 | 67 | 47 | 50 |
| H/C Ratio, mole | 1.69 | 1.81 | 1.81 | 1.78 | 1.72 | 1.73 |
| Volume Expansion, % | 3.6 | 6.3 | 5.7 | 5.2 | 3.8 | 3.9 |

TABLE 2-continued

DISTILLATE DEAROMATIZATION

| | Catalyst | | | | | |
|---|---|---|---|---|---|---|
| | 10 | 11 | 12 | 13 | 14 | 15 |
| Cetane Number, calc. | 40.8 | 46.1 | 44.6 | 43.5 | 40.0 | 40.4 * |
| Cetane Number, Inc. | 7.7 | 14.2 | 12.7 | 11.6 | 8.1 | 8.5 |

EXAMPLE 16

Two feedstocks, A and B, consisting of hydrogenated light catalytic cycle oil were prepared from light catalytic cycle oil obtained from the Amoco Oil Company Texas City Refinery. The light catalytic cycle oils were hydrotreated in a high-pressure trickle-bed unit at a pressure of 300 psig and a temperature of 600° F., to sulfur levels of 340 ppm and 378 ppm respectively. The hydrotreated light catalytic cycle oil properties for the respective streams A and B are described in Table 3.

TABLE 3

| FEEDSTOCK PROPERTIES | FEEDSTOCK A | FEEDSTOCK B |
|---|---|---|
| API Gravity, ° | 24.1 | 24.0 |
| Mass Spec Analysis, wt %* | | |
| Saturates | 31.5 | 33.2 |
| Aromatics | 68.5 | 66.8 |
| Mono- | 44.4 | 37.9 |
| Di- | 21.2 | 24.6 |
| Tri- | 2.8 | 4.3 |
| FIA Aromatics, Vol % (ASTM D1319) | 63.0 | 62.0 |
| Elemental Analysis (ASTM C-730) | | |
| Carbon, wt % | 87.74 | 88.75 |
| Hydrogen, wt % | 11.09 | 11.06 |
| Sulfur, ppm | 340 | 378 |
| Nitrogen, ppm | 110 | 165 |
| H/C, Mole Ratio | 1.52 | 148 |
| Cetane Number (Calc.) | 31.9 | 33.1 |
| Simulated Distillation (ASTM D-2887), °F. | | |
| IBP | 281 | 322 |
| 1% | 302 | 335 |
| 5% | 374 | 394 |
| 10% | 410 | 412 |
| 30% | 466 | 474 |
| 50% | 518 | 530 |
| 70% | 574 | 592 |
| 90% | 647 | 660 |
| 95% | 675 | 686 |
| 99% | 736 | 735 |
| 99.5% | 771 | 757 |

EXAMPLE 17

The feedstocks of Example 16 were hydrogenated over Catalysts 1 through 15 from Examples 1 through 15. Catalyst performance was evaluated using a bench scale, isothermal reactor having a ¾-inch internal diameter and a thermowell. Operation was downflow with once-through hydrogen and oil. Each catalyst was used in the form of ¹⁄₁₆-inch extrudates and each catalyst charge was approximately 20 g. The catalyst charge was diluted 4:1 v/v (diluent:catalyst) with non-porous alpha-alumina (14/20 mesh). The catalyst was supported near the center of the reactor on a layer of 3 mm Pyrex glass beads, and a preheat zone of 5 mm beads was provided above the catalyst bed.

Each catalyst was pretreated prior to testing by injecting hydrogen through the reactor at a flowrate of 0.6 SCFH for 2 hours. Reactor conditions were maintained at 600° F. and 1200 psig during the pretreatment step.

Operating conditions for the runs were approximately a pressure of 1200 psig, a temperature of 600° F., a liquid hourly space velocity (LHSV) of 1.0 hr$^{-1}$, and a hydrogen injection rate of 4000 SCF/Bbl.

Over each 24-hour period, at least a 6-hour sample of product was collected in a nitrogen-purged receptacle. Nitrogen purging was performed to remove hydrogen sulfide. The product was analyzed for API gravity, sulfur content (elemental) by X-ray fluorescence, nitrogen content, aromatics content by Mass Spec. Analysis as published in *Analytic Chemistry*, 43(11), pages 1425–1434 (1971), and hydrogen to carbon ratio. Process and product calculations were performed to measure percent aromatics saturation, percent volume expansion, and product cetane number. The cetane number was provided by an empirical correlation which determines cetane number from product properties such as API gravity and the boiling point temperature at atmospheric pressure, at which 50 vol % of the distillate feed or product stream is vaporized.

The catalyst composition, process conditions, product properties, and process calculations for Catalysts 1 through 15 described in Examples 1 through 15 are specified in Tables 1 and 2.

Catalyst 1 having 0.5 wt % palladium on a support comprising beta zeolite having a sodium content of 89 ppm, provided average volume expansion and cetane number improvement and below average desulfurization, denitrogenation, and aromatic saturation compared to all of the catalysts tested.

Catalyst 2 having 0.5 wt % platinum on a support comprising beta zeolite having a sodium content of 89 ppm, provided average desulfurization and denitrogenation and poor aromatic saturation, volume expansion, and cetane number improvement. Catalysts 1 and 2 illustrate that a beta zeolite hydrogenation catalyst with either a palladium or platinum hydrogenation metal alone, provides below average hydrogenation performance.

Catalyst 3 comprising a 50%/50% physical mixture of Catalysts 1 and 2, provided average denitrogenation performance and poor desulfurization, aromatic saturation, volume expansion, and cetane number improvement. Catalyst 3 illustrates that a physical mixture of catalysts having palladium and platinum incorporated onto the beta zeolite independently, provides worse performance than the independent hydrogenation metal Catalysts 1 and 2.

Catalyst 4 having 0.25 wt % palladium and 0.25 wt % platinum on a support comprising beta zeolite having a sodium content of 89 ppm, provided outstanding denitrogenation and above average desulfurization, aromatic saturation, volume expansion, and cetane number improvement.

Catalyst 4 having 0.25 wt % palladium and 0.25 wt % platinum on a support comprising beta zeolite having a sodium content of 89 ppm processing feedstock A instead of B, provided outstanding denitrogenation, aromatic saturation, volume expansion, and cetane number improvement and above average desulfurization. Catalyst 4, in accordance with the present invention, provided superior overall performance compared with the catalysts tested.

Catalyst 5 having 0.25 wt % palladium and 0.25 wt % platinum on a support comprising beta zeolite having a sodium content of 0.233 wt %, provided outstanding denitrogenation, aromatic saturation, volume expansion, and cetane number improvement and above average desulfurization.

Catalyst 5 having 0.25 wt % palladium and 0.25 wt % platinum on a support comprising beta zeolite having a sodium content of 0.233 wt % processing feedstock A instead of B, provided outstanding desulfurization, denitrogenation, volume expansion, and cetane number improvement and above average aromatic saturation. Catalyst 5, in accordance with the present invention, and comprising slightly more sodium than Catalyst 4, also provided superior overall performance compared with the catalysts tested.

Catalyst 6 having 0.25 wt % palladium and 0.25 wt % platinum on a support comprising alumina, provided below average desulfurization and poor denitrogenation, aromatics saturation, volume expansion, and cetane number improvement.

Catalyst 7 having 0.25 wt % palladium and 0.25 wt % platinum on a support comprising zeolite Y having a sodium content of 3.1 wt %, provided outstanding denitrogenation, above average aromatic saturation, volume expansion, and cetane number improvement, and average desulfurization.

Catalyst 8 having 0.25 wt % palladium and 0.25 wt % platinum on a support comprising borosilicate, provided outstanding denitrogenation and aromatic saturation, and above average desulfurization, volume expansion, and cetane number improvement.

Catalyst 9 having 0.25 wt % palladium and 0.25 wt % platinum on a support comprising mordenite, provided average desulfurization and below average denitrogenation, aromatic saturation, volume expansion, and cetane number improvement. The alumina and molecular sieve supported Catalysts 6 through 9 provided hydrogenation performance ranging from poor to above average but none of the Catalysts 6 through 9 were as effective overall as the beta zeolite supported Catalysts 4 and 5.

Catalyst 10 having 0.50 wt % palladium on a support comprising beta zeolite having 0.233 wt % sodium, provided average denitrogenation and below average desulfurization, aromatics saturation, volume expansion, and cetane number improvement. Catalyst 10 illustrates that an increase in sodium on the beta zeolite support does not substantially improve the catalyst performance wherein only palladium is present.

Catalyst 11 having 0.25 wt % palladium and 0.25 wt % platinum on a support comprising beta zeolite having 0.27 wt % sodium, provided outstanding desulfurization, denitrogenation, volume expansion, and cetane number improvement and above average aromatic saturation.

Catalyst 12 having 0.25 wt % palladium and 0.25 wt % platinum on a support comprising beta zeolite having 0.77 wt % sodium, provided outstanding desulfurization and denitrogenation and above average aromatic saturation, volume expansion, and cetane number improvement.

Catalyst 13 having 0.25 wt % palladium and 0.25 wt % platinum on a support comprising beta zeolite having 1.27 wt % sodium, provided above average desulfurization, denitrogenation, aromatic saturation, volume expansion, and cetane number improvement.

Catalyst 14 having 0.25 wt % palladium and 0.25 wt % platinum on a support comprising beta zeolite having 1.77 wt % sodium, provided above average denitrogenation, average desulfurization, and below average aromatic saturation, volume expansion, and cetane improvement.

Catalyst 15 having 0.25 wt % palladium and 0.25 wt % platinum on a support comprising beta zeolite having 2.77 wt % sodium, provided below average desulfurization, denitrogenation, aromatic saturation, volume expansion, and cetane number improvement.

Catalysts 11 through 15 illustrate that catalysts comprising zeolite beta having from 0.27 wt % to 2.77 wt % of sodium are all effective hydrogenation catalysts. The best catalysts were Catalysts 11, 12, and 13 having 0.27 wt %, 0.77 wt %, and 1.27 wt % sodium respectively.

Other embodiments of the invention will be apparent to those skilled in the art from a consideration of this specification or from practice of the invention disclosed herein. It is intended that this specification be considered as exemplary only with the true scope and spirit of the invention being indicated by the following claims.

That which is claimed is:

1. A hydrogenation catalyst suitable for hydrogenation of hydrocarbon feedstock consisting of a support of beta zeolite and a refractory inorganic oxide and from about 0.1 percent by weight to about 2.0 percent by weight each of palladium and platinum calculated as a percentage of said catalyst, the sodium concentration in said beta zeolite ranging from about 1 ppm by weight to about 3.0 percent by weight calculated as a percentage of said beta zeolite.

2. The catalyst of claim 1 wherein said support comprises from about 40 percent by weight to about 85 percent by weight beta zeolite.

3. The catalyst of claim 1 wherein said beta zeolite comprises from about 1 ppm by weight to about 2.0 percent by weight sodium.

4. The catalyst of claim 1 wherein said beta zeolite has a silicon to aluminum atomic ration ranging from about 10 to about 30.

5. The catalyst of claim 1 wherein said palladium and said platinum are present in a weight ratio ranging from about 5:1 to about 1:1.

6. The catalyst of claim 1 wherein said palladium is present in said catalyst in an amount ranging from about 0.2 percent by weight to about 1.5 percent by weight and said platinum is present in said catalyst in an amount ranging from about 0.2 percent by weight to about 1.5 percent by weight.

* * * * *